US012542619B1

United States Patent
Lie et al.

(10) Patent No.: US 12,542,619 B1
(45) Date of Patent: Feb. 3, 2026

(54) MACHINE LEARNED MODELS FOR DETECTING VIEWER PRESENCE USING WI-FI CHANNEL STATE INFORMATION

(71) Applicant: Google LLC, Mountain View, CA (US)

(72) Inventors: Ching Ming Lie, Bothell, WA (US); Michael Robert Fain, Bothell, WA (US)

(73) Assignee: GOOGLE LLC, Mountain View, CA (US)

( * ) Notice: Subject to any disclaimer, the term of this patent is extended or adjusted under 35 U.S.C. 154(b) by 316 days.

(21) Appl. No.: 18/475,911

(22) Filed: Sep. 27, 2023

(51) Int. Cl.
 *H04B 17/391* (2015.01)
 *H04B 7/06* (2006.01)
 *H04N 21/466* (2011.01)

(52) U.S. Cl.
 CPC ....... *H04B 17/3913* (2015.01); *H04B 7/0626* (2013.01); *H04N 21/4667* (2013.01)

(58) Field of Classification Search
 CPC .............. H04B 17/3913; H04B 7/0626; H04N 21/4667
 See application file for complete search history.

(56) References Cited

U.S. PATENT DOCUMENTS 11,688,263 B2 * 6/2023 Shin .................. G08B 21/043
340/573.1

OTHER PUBLICATIONS

Oshiga et al., "Human Detection for Crowd Count Estimation Using CSI of WiFi Signals.", Fifteenth International Conference on Electronics Computer and Computation (ICECCO2019), Abuja, Nigeria, Dec. 10-12, 2019, 6 pages.

* cited by examiner

Primary Examiner — Ankur Jain
(74) Attorney, Agent, or Firm — DORITY & MANNING P.A.

(57) ABSTRACT

Example embodiments of the present disclosure provide for an example method for machine learned models for detecting viewer presence using Wi-Fi Channel State Information (CSI). For instance, the method can include obtaining data comprising Wi-Fi CSI from a receiver associated with a device. The method can include determining a predicted number of viewers in front of the device using a Wi-Fi CSI machine-learned model. The method can include displaying a prompt for a user to respond to via a second user computing device responsive to determining the predicted number of viewers. The method can include generating a training dataset based on the obtained user input, obtained Wi-Fi CSI, and the predicted number of viewers. Updating the Wi-Fi CSI machine-learned model based on the training dataset and using the updated Wi-Fi CSI machine-learned model to predict a number of viewers based on second Wi-Fi CSI data.

20 Claims, 3 Drawing Sheets

MACHINE LEARNED MODELS FOR DETECTING VIEWER PRESENCE USING WI-FI CHANNEL STATE INFORMATION

FIELD

The present disclosure relates generally to improved methods for training machine-learned models to predict TV viewership. More particularly, the present disclosure relates to generating training data for determining presence of viewer and number of viewers based on Wi-Fi Channel State Information (CSI) obtained from a receiver associated with a TV.

BACKGROUND

Analytics companies use audience determination methods to determine TV viewership. Present methods rely on manually selected user inputs obtained from panelists who opt-in to providing data on TV-watching habits. The system can extrapolate this data to determine estimated viewership or TV-watching habits for larger populations. The data can be used to determine program popularity, content item selection, or content item performance.

SUMMARY

Aspects and advantages of embodiments of the present disclosure will be set forth in part in the following description, or can be learned from the description, or can be learned through practice of the embodiments.

In one example aspect, the present disclosure provides for an example computer-implemented method. The example computer-implemented method includes obtaining, by a computing system, from a receiver of a streaming computing device, data including Wi-Fi channel state information (CSI), the channel state information including Wi-Fi CSI from a receiver associated with a device. The example computer-implemented method includes determining, using a Wi-Fi CSI machine-learned model, a predicted number of viewers located within a predetermined proximity of the receiver. The example computer-implemented method includes transmitting instructions that when executed by a user computing device cause the user computing device to provide for display a prompt for user input responsive to determining the predicted number of viewers. The example computer-implemented method includes obtaining, by the computing system, from the user computing device, data including a user-obtained input including a number of people in the predetermined proximity of the receiver. The example computer-implemented method includes generating, by the computing system, a training data structure including the Wi-Fi CSI, a predicted number of viewers, and the user-obtained input number of viewers. The example computer-implemented method includes updating the Wi-Fi CSI machine-learned model based on the training data structure. The example computer-implemented method includes predicting, using the updated Wi-Fi CSI machine-learned model, a second number viewers located within the predetermined proximity of the receiver based on second obtained Wi-Fi CSI data.

In an example aspect, the present disclosure provides for an example system for training machine-learned models to predict TV viewership, including one or more processors and one or more memory devices storing instructions that are executable to cause the one or more processors to perform operations. In some implementations, the one or more memory device can include one or more transitory or non-transitory computer-readable media storing instructions that are executable to cause the one or more processors to perform operations. In the example system, the operations can include obtaining, by a computing system, from a receiver of a streaming computing device, data including Wi-Fi channel state information (CSI), the channel state information including Wi-Fi CSI from a receiver associated with a device. In the example system, the operations can include determining, using a Wi-Fi CSI machine-learned model, a predicted number of viewers located within a predetermined proximity of the receiver. In the example system, the operations can include transmitting instructions that when executed by a user computing device cause the user computing device to provide for display a prompt for user input responsive to determining the predicted number of viewers. In the example system, the operations can include obtaining, by the computing system, from the user computing device, data including a user-obtained input including a number of people in the predetermined proximity of the receiver. In the example system, the operations can include generating, by the computing system, a training data structure including the Wi-Fi CSI, a predicted number of viewers, and the user-obtained input number of viewers. In the example system, the operations can include updating the Wi-Fi CSI machine-learned model based on the training data structure. In the example system, the operations can include predicting, using the updated Wi-Fi CSI machine-learned model, a second number viewers located within the predetermined proximity of the receiver based on second obtained Wi-Fi CSI data.

In an example aspect, the present disclosure provides for an example transitory or non-transitory computer readable medium embodied in a computer-readable storage device and storing instructions that, when executed by a processor, cause the processor to perform operations. In the example transitory or non-transitory computer-readable medium, the operations can include obtaining, by a computing system, from a receiver of a streaming computing device, data including Wi-Fi channel state information (CSI), the channel state information including Wi-Fi CSI from a receiver associated with a device. In the example transitory or non-transitory computer-readable medium, the operations can include determining, using a Wi-Fi CSI machine-learned model, a predicted number of viewers located within a predetermined proximity of the receiver. In the example transitory or non-transitory computer-readable medium, the operations can include transmitting instructions that when executed by a user computing device cause the user computing device to provide for display a prompt for user input responsive to determining the predicted number of viewers. In the example transitory or non-transitory computer-readable medium, the operations can include obtaining, by the computing system, from the user computing device, data including a user-obtained input including a number of people in the predetermined proximity of the receiver. In the example transitory or non-transitory computer-readable medium, the operations can include generating, by the computing system, a training data structure including the Wi-Fi CSI, a predicted number of viewers, and the user-obtained input number of viewers. In the example transitory or non-transitory computer-readable medium, the operations can include updating the Wi-Fi CSI machine-learned model based on the training data structure. In the example transitory or non-transitory computer-readable medium, the operations can include predicting, using the updated Wi-Fi CSI machine-learned model, a second number viewers located within the predetermined proximity of the receiver based on second obtained Wi-Fi CSI data.

BRIEF DESCRIPTION OF THE DRAWINGS

Detailed discussion of embodiments directed to one of ordinary skill in the art is set forth in the specification, which makes reference to the appended figures, in which.

Figure 1:
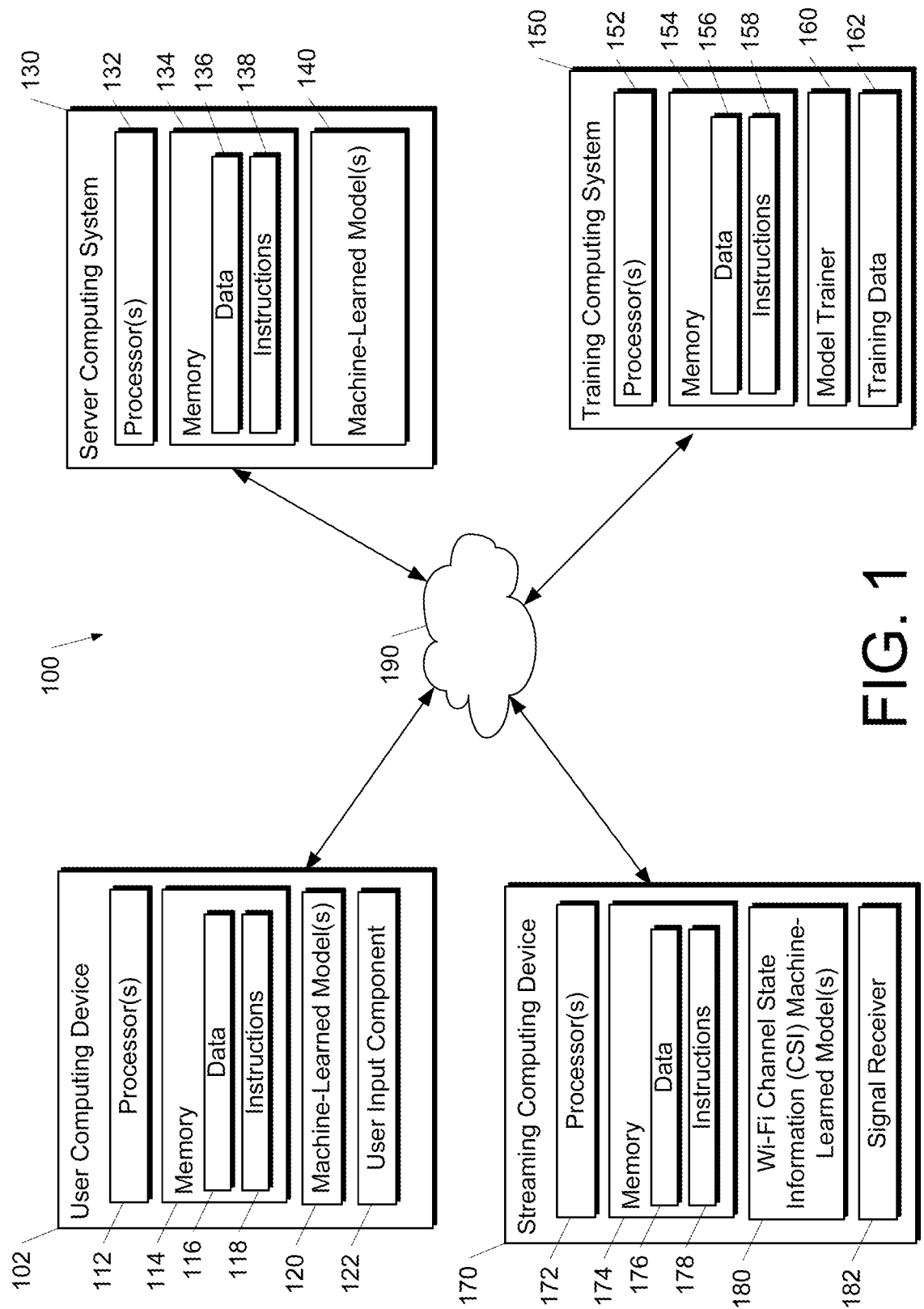
FIG. 1 depicts a block diagram of an example computing system that performs viewer detection using Wi-Fi CSI data according to example embodiments of the present disclosure.

Reference numerals that are repeated across plural figures are intended to identify the same features in various implementations.

DETAILED DESCRIPTION

Generally, the present disclosure is directed to a system for training Wi-Fi channel state information (CSI) machine-learned models to determine a number of viewers of a connected TV device for use in audience measurement systems. For instance, existing audience measurement methods rely solely on user input for determining a number of viewers or the presence of a viewer of streaming content being streamed on a streaming computing device, such as a connected TV. Determination of viewership can be utilized to determine when to provide content items for display or additional input for selection of the content items. In some instances, audience viewership can be used to determine instances where viewers have departed from viewing distance of the streaming computing device which can result in the system automatically changing the state of the streaming computing device. For instance, the streaming computing device state can be changed from an active state (e.g., "on") to an inactive state (e.g., "off"). Thus, responsive to determining that there are no viewers of the streaming computing device, the streaming computing device can be turned off to save computing resources and avoiding unnecessary transmission of data over a network as well as reduce network bandwidth utilization and computing resources.

The present disclosure provides for continual training or updating Wi-Fi CSI models for use in predicting viewer presence and number of viewers using data obtained from a TV meter device (e.g., user computing device). Many analytics services utilize panels (e.g., groups of individuals who have opted in to provide viewing data) to determine viewership and extrapolate the viewership data to a universal population of users. The present disclosure can provide for generating training data sets which can be used to update the Wi-Fi CSI models associated with streaming computing devices with related TV meter computing devices which can be used for Wi-Fi CSI model training on streaming computing device. Additionally, training data generated for a plurality of streaming computing devices associated with panelists can be anonymized and aggregated to generate a larger training data set which can be used to train Wi-Fi CSI machine-learned models on streaming computing devices that are not associated with panelists but are otherwise opted into use of Wi-Fi CSI data for audience measurement or content selection.

With reference now to the Figures, example embodiments of the present disclosure will be discussed in further detail.

FIG. 1 depicts a block diagram of an example computing system 100 that performs training of Wi-Fi Channel State Information (CSI) Models for Audience Measurement according to example embodiments of the present disclosure. The system 100 includes a user computing device 102, a server computing system 130, a training computing system 150, and a streaming computing device 170 that are communicatively coupled over a network 190.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIG. 3.

In some implementations, the one or more machine-learned models 120 can be received from the server computing system 130 over network 190, stored in the user computing device memory 114, and then used or otherwise implemented by the one or more processors 112. In some implementations, the user computing device 102 can implement multiple parallel instances of a single machine-learned model 120 (e.g., to perform parallel processing across multiple instances of Wi-Fi CSI data).

More particularly, the machine-learned models 120 can be trained to predict a number of viewers based on channel state information (CSI).

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 130 as a portion of a web service (e.g., a streaming service, an audience measurement service). Thus, one or more models 120 can be stored and implemented at the user computing device 102 or one or more models 140 can be stored and implemented at the server computing system 130 or one or more models 180 can be stored and implemented at the streaming computing device 170.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIG. 3.

The streaming computing device 170 can be any type of computing device, such as, for example, a connected television, a personal computing device (e.g., laptop or desktop), a mobile computing device (e.g., smartphone or tablet), a gaming console or controller, a wearable computing device, an embedded computing device, or any other type of computing device.

The streaming computing device 170 includes one or more processors 172 and a memory 174. The one or more processors 172 can be any suitable processing device (e.g., a processor core, a microprocessor, an ASIC, an FPGA, a controller, a microcontroller, etc.) and can be one processor or a plurality of processors that are operatively connected. The memory 174 can include one or more non-transitory computer-readable storage media, such as RAM, ROM, EEPROM, EPROM, flash memory devices, magnetic disks, etc., and combinations thereof. The memory 174 can store data 176 and instructions 178 which are executed by the processor 172 to cause the streaming computing device 170 to perform operations.

In some implementations, the streaming computing device 170 can store or include one or more Wi-Fi Channel State Information (CSI) Machine-learned models 180. For example, the Wi-Fi Channel State Information (CSI) Machine-learned models 180 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example Wi-Fi Channel State Information (CSI) machine-learned models 180 are discussed with reference to FIG. 3.

In some implementations, the one or more Wi-Fi Channel State Information (CSI) machine-learned models 180 can be received from the server computing system 130 over network 190, stored in the user computing device memory 174, and then used or otherwise implemented by the one or more processors 172. In some implementations, the streaming computing device 170 can implement multiple parallel instances of a single machine-learned model 180 (e.g., to perform parallel processing across multiple instances of Wi-Fi CSI data).

More particularly, the Wi-Fi Channel State Information (CSI) Machine-learned models 180 can be trained to predict viewer presence and number of viewers within a threshold distance of the streaming computing device 170. For instance, the Wi-Fi CSI machine-learned models 180 can be trained using ground truth data obtained from user computing device 102. The Wi-Fi CSI machine-learned model can be personalized and trained to detect a distinction between an empty space within threshold distance of the streaming computing device 170 and a one or more viewers being located within the threshold distance of the streaming computing device 170.

Additionally, or alternatively, one or more Wi-Fi CSI machine-learned models 180 can be included in or otherwise stored and implemented by the server computing system 130 that communicates with the streaming computing device 170 according to a client-server relationship. For example, the Wi-Fi CIS machine-learned models 180 can be implemented by the server computing system 130 as a portion of a web service (e.g., a streaming service, an audience measurement service). Thus, one or more Wi-Fi CSI machine-learned models 180 can be stored and implemented at the streaming computing device 170 or one or more models 140 can be stored and implemented at the server computing system 130 or one or more models 180 can be stored and implemented at the user computing device 102.

The streaming computing device 170 can also include one or more signal receivers 182 that receive Wi-Fi CSI. Additionally, the streaming computing device 170 can include software capable of obtaining and extracting relevant data from received Wi-Fi CSI. For example, the signal receiver 182 can be a component that receives wireless radio signals transmitted by a Wi-Fi router or access point. The signal receiver 182 can be configured to monitor and packet capture at a low-level. An example signal receiver 182 can include Wi-Fi network interface cards (NICs) that support monitor mode and include drivers compatible with Wi-Fi CSI data collection. The raw Wi-Fi frames which include Wi-Fi CSI data can be captured by signal receiver 182 and processed using packet capturing software. Responsive to capturing the Wi-Fi frames data, the Wi-Fi CSI data can be extracted. The Wi-Fi CSI data can be stored in memory 174 and accessed by Wi-Fi CSI machine-learned models 180 for viewer prediction. The Wi-Fi CSI machine-learned models can determine viewer prediction based at least in part on changes in amplitude, phase, or frequency. Wi-Fi CSI machine-learned models 180 can be calibrated or personalized to a respective streaming computing device 170. The calibration can account for antenna characteristics, hardware specific characteristics, or location-based characteristics.

The streaming computing device 170 or the server computing system 130 can train the models 120 or 140 via interaction with the training computing system 150 that is communicatively coupled over the network 190. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120, 140, or 180 stored at the streaming computing device 170, user computing device 102, or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 or Wi-Fi CSI machine-learned models 180 based on a set of training data 162. The training data 162 can include, for example, user input data obtained from user input component 122. The user input data can include data indicative of a presence of a viewer within the threshold of the streaming computing device or a number of viewers within the threshold distance of the streaming computing device. The threshold distance can be a predetermined distance based on characteristics of a Wi-Fi router or the signal receiver 182. The user input data can be associated with Wi-Fi CSI data obtained at a simultaneous time. For instance, the Wi-Fi CSI data associated with a presence of one or more viewers can be mapped to an indication of viewership presence or number of viewers and stored as a set of training data 162. In some implementations, the training data can be used to personalize Wi-Fi CSI machine-learned models 180 by determining a baseline Wi-Fi CSI data and comparing that to Wi-Fi CSI data that is associated with a known instance of viewership.

In some implementations, if the user has provided consent, the training examples can be provided by the user computing device 102 or streaming computing device 170. Thus, in such implementations, the Wi-Fi CSI machine-learned model 180 is provided to the streaming computing device 170 can be trained by the training computing system 150 on user-specific data received from the streaming computing device 170 or user computing device 102. In some instances, this process can be referred to as personalizing the model.

The model trainer 160 includes computer logic utilized to provide desired functionality. The model trainer 160 can be implemented in hardware, firmware, or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 190 can be any type of communications network, such as a local area network (e.g., intranet), wide area network (e.g., Internet), or some combination thereof and can include any number of wired or wireless links. In general, communication over the network 190 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some implementations, the input to the machine-learned model(s) of the present disclosure can be sensor data (e.g., signal data). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a diagnostic output. As another example, the machine-learned model(s) can process the sensor data to generate a detection output.

FIG. 1 illustrates one example computing system that can be used to implement the present disclosure. Other computing systems can be used as well. For example, in some implementations, the streaming computing device 170 can include the model trainer 160 and the training data 162. In such implementations, the machine-learned models 120 or Wi-Fi CSI machine-learned models can be both trained and used locally at the streaming computing device 170. In some of such implementations, the streaming computing device 170 can implement the model trainer 160 to personalize the machine-learned models 120 or Wi-Fi CSI machine-learned models 180 based on user-specific data.

Figure 2:
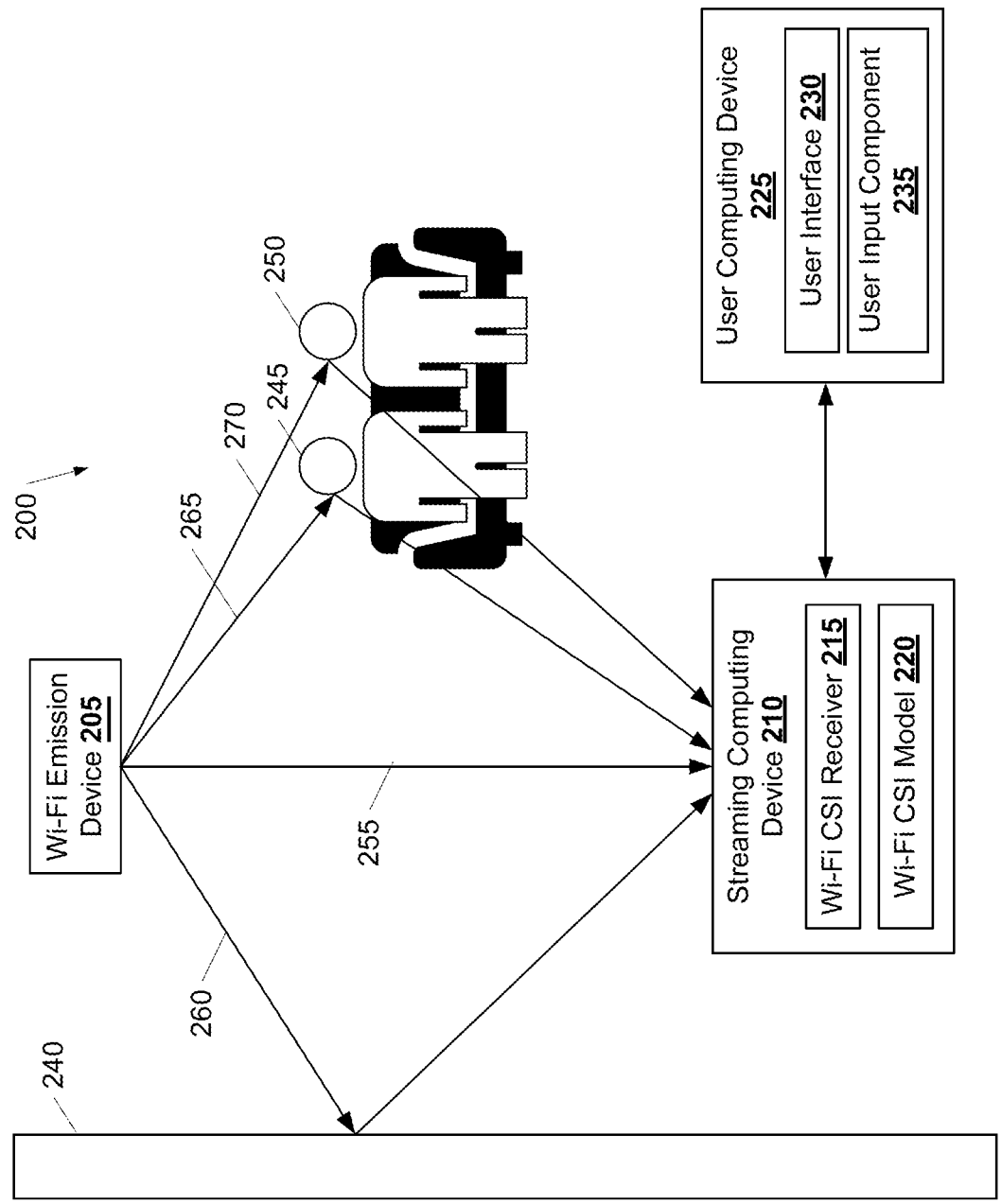
FIG. 2 depicts a block diagram of an example computing environment according to example embodiments of the present disclosure.

FIG. 2 depicts a block diagram of an example computing environment 200 including a Wi-Fi emission device 205, streaming computing device 210, or user computing device 225. Additionally, computing environment 200 includes a wall 240 and viewers 245 and 250. As described herein, streaming computing device 210 can obtain Wi-Fi CSI data via Wi-Fi CSI receiver 215. The obtained Wi-Fi CSI data can be obtained by Wi-Fi CSI model 220 to determine a predicted viewer presence or number of viewers. User computing device 225 can include user interface 230 and user input component 235 which can be utilized to obtain user input indicative of viewer presence or number of viewers. In some implementations, the user interface 230 can provide a message for display requesting a viewer provide user input confirming viewer presence responsive to the Wi-Fi CSI model 220 predicting user presence based on obtained Wi-Fi CSI data. In some implementations, the predicted number of viewers can be transmitted alongside automatic content recognition (ACR) data to a content selection service to determine one or more content items to provide for display via streaming computing device 210 (e.g., an advertisement during streaming of a program).

Wi-Fi emission device 205 can transmit signals 255, 260, 265, or 270 which can be received at streaming computing device 210. Wi-Fi emission device 205 can include device capable of transmitting Wi-Fi signals. For instance, Wi-Fi emission device 205 can include a Wi-Fi router (wireless routers), wireless access points (WAPs), smartphones, laptops, computers, tablets, gaming consoles, smart TVs, Wi-Fi extenders or repeaters, or any other devices capable of emitting Wi-Fi signals. In some implementations, a computing environment can include more than one Wi-Fi emission device. In some instances, the signals and associated Wi-Fi CSI data can be transmitted to streaming computing device 210 without interference as depicted by signal 255. Some materials can cause reflection or disturbance of the signals. For instance, wall 240 can cause a reflection of signal 260, viewer 245 can cause a reflection of signal 265, and viewer 250 can cause a reflection of signal 270. The Wi-Fi CSI receiver 215 can obtain the Wi-Fi CSI data (e.g., signals and associated characteristics data). The Wi-Fi CSI receiver 215 can be processed at streaming computing device 210 to be utilized as input into Wi-Fi CSI model 220. The Wi-Fi CSI model 220 can predict a presence of a viewer and number of viewers. In some instances, the presence of a viewer or number of viewers can be used alongside obtained user input data to update or train Wi-Fi CSI model 220. In some instances, Wi-Fi CSI data can be associated with user input data or a prediction to generate a training data set. While the Wi-Fi CSI model 220 is depicted as being located in the streaming computing device 210, it can be understood that the Wi-Fi CSI model can be stored or implemented on user computing device 225.

Figure 3:
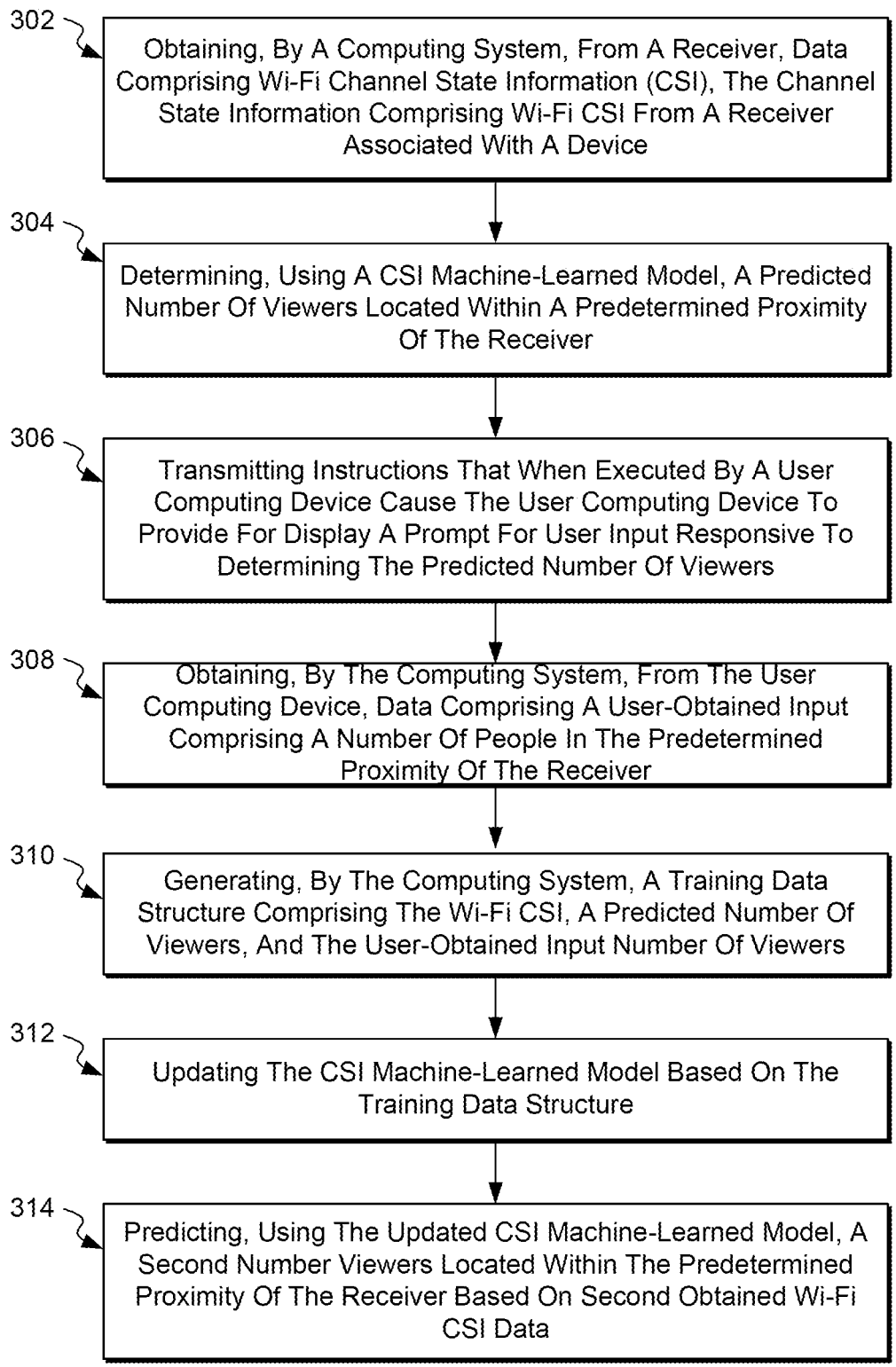
FIG. 3 depicts a flow chart diagram of an example method to perform viewer detection using Wi-Fi CSI data according to example embodiments of the present disclosure.

FIG. 3 depicts a flow chart diagram of an example method 300 to perform viewer detection using Wi-Fi CSI data according to example embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by streaming computing device 170 or user computing device 102. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processors can be omitted in various embodiments. Thus, not all processes are required in every embodiment. Other process flows are possible.

At operation 302, processing logic obtains, by a computing system, from a receiver of a streaming computing device, data including Wi-Fi channel state information (CSI), the channel state information including Wi-Fi CSI from a receiver associated with a device. The streaming computing device comprises at least one of a television or a streaming stick. For instance, the streaming device can include a connected TV associated with providing a streaming service for streaming content.

At operation 304, processing logic determines, using a Wi-Fi CSI machine-learned model, a predicted number of viewers located within a predetermined proximity of the receiver. The threshold distance can be a predetermined distance based on characteristics of a Wi-Fi router or the signal receiver. For instance, the predetermined proximity of the receiver can be a distance set by the system based on Wi-Fi CSI machine-learned model performance or an expected viewer distance from a television. In some instances, the predetermined proximity of the receiver can be personalized based on receiver capabilities or Wi-Fi CSI data. In some instances, the viewer can be located between the Wi-Fi router and the streaming computing device including the receiver.

In some implementations, the Wi-Fi CSI machine-learned model can determine a baseline Wi-Fi CSI state. The predicted number of viewers can be based at least in part on comparing the baseline Wi-Fi CSI state to the obtained data including Wi-Fi CSI. For instance, a baseline Wi-Fi CSI state can be associated with an empty room (e.g., the location within the distance of the receiver being empty). The baseline Wi-Fi CSI state can be established for a streaming computing device as a means for calibrating the system. For instance, determining a baseline Wi-Fi CSI dataset (e.g., indicative of the baseline Wi-Fi CSI state) for the location within a predetermined distance of the receiver can be performed responsive to determining that the streaming computing device is in an inactive state (e.g., off). Additionally, or alternatively, the system can determine the baseline Wi-Fi CSI state based on obtaining Wi-Fi CSI data during a time period normally associated with an inactive state of the streamlining computing device.

The obtained Wi-Fi CSI data can include raw Wi-Fi CSI data. The raw Wi-Fi CSI data can be processed on-device. For instance, the Wi-Fi CSI machine-learned model can be stored on the streaming device and process the Wi-Fi CSI data on the device. As such, the prediction of the model can be the sole data transmitted off device.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

At operation 306, processing logic transmits instructions, that when executed by a user computing device cause the user computing device to provide for display a prompt for user input responsive to determining the predicted number of viewers. For instance, the user computing device can be a television (TV) meter tablet. The TV meter tablet can be provided by a service provider associated with analysis of audience data. The prompt for user input can include, for instance, a request for a user to sign-in, a request for a user to start a viewing session, a request for a user to select a number of predicted viewers, or other relevant viewership data.

At operation 308, processing logic obtains, by the computing system, from the user computing device, data including a user-obtained input including a number of people in the predetermined proximity of the receiver. For instance, the user-obtained input can include a user sign-in, a user selection to start a viewing session, a user selection of a number of viewers, a user freeform input of a number of viewers.

At operation 310, processing logic generates, by the computing system, a training data structure including the Wi-Fi CSI, a predicted number of viewers, and the user-obtained input number of viewers. For instance, the user-obtained input data can include data indicative of a presence of a viewer within the threshold of the streaming computing device or a number of viewers within the threshold distance of the streaming computing device. The user input data can be associated with Wi-Fi CSI data obtained at a simultaneous time. For instance, the Wi-Fi CSI data associated with a predicted number of viewers can be stored in a data structure with the predicted number of viewers and user-obtained number of viewers as a training dataset. In some implementations, the training data can be used to personalize Wi-Fi CSI machine-learned models by determining a baseline Wi-Fi CSI data and comparing that to Wi-Fi CSI data that is associated with a known instance of viewership.

At operation 312, processing logic updates the Wi-Fi CSI machine-learned model based on the training data structure. For instance, Wi-Fi CSI machine-learned model can be trained using a feedback loop based on the predicted number of viewers and ground truth user-obtained data. In some instances, updating the Wi-Fi CSI machine-learned model is further based on automatic content recognition (ACR) data. The ACR data can include at least one of content identification data, viewership measurement data, content tracking data, or content recommendation data.

At operation 314, processing logic predicts, using the updated Wi-Fi CSI machine-learned model, a second number viewers located within the predetermined proximity of the receiver based on second obtained Wi-Fi CSI data. For instance, the model can use the first number of viewers as a training set and the second number of viewers can be a near real-time prediction of number of viewers. In some instances, the Wi-Fi CSI machine-learned model determines the predicted second number of viewers based at least in part on a rolling window standard deviation. For instance, the machine-learned model can use clustering or pattern recognition to determine when differences in the Wi-Fi CSI data from the baseline Wi-Fi CSI data should be determined to be indicative of a viewer or number of viewers.

The processing logic can obtain, by the computing system, from the user computing device second data including a user-obtained input including a second number of people in the predetermined proximity of the receiver. In some instances, the second number of viewers can also be used to append a training data structure. For instance, the processing logic can append the training data structure to include the second Wi-Fi CSI, a second predicted number of viewers, and the second user-obtained number of viewers.

The processing logic can update the Wi-Fi CSI machine-learned model based on the appended training data structure. The processing logic can transmit data including the predicted second number of viewers located within the predetermined proximity of the receiver to a content selection component. The processing logic can obtain, from the content selection component, one or more content items to be provided for display via streaming computing device, the one or more content items selected based at least in part on the predicted second number of viewers. The processing logic can provide the one or more content items to be provided for display via a user interface of the streaming computing device. Additionally, or alternatively, the one or more content items are selected based at least in part on a household profile. Additionally, or alternatively, the one or more content items are selected based at least in part on a bidding process.

In some implementations, the processing logic can determine that the predicted second number of viewers is zero viewers. The processing logic can, responsive to determining the predicted second number of viewers is zero viewers, transmit instructions that when executed by a user computing device cause the user computing device to provide for display a prompt for user input responsive to determining the predicted number of viewers. The processing logic can determine that a predetermined duration of time has passed without receipt of user input responsive to the displayed prompt. The processing logic can automatically adjust the state of the streaming computing device responsive to determining that the predetermined duration of time has passed without receipt of user input.

For instance, the Wi-Fi CSI machine-learned model can determine that a viewer has left a room or location associated with the streaming computing device. Responsive to the determination that the viewer has left, the system can provide a message via the user computing device asking if the viewer has left the room. If a viewer does not provide a response, the system can infer that there are no viewers, and perform an action, such as turning off the streaming device or putting the streaming device in sleep mode. For instance, this can include automatically adjusting the state of the streaming computing device from an active state to an inactive state. The inactive state can include turning the streaming computing device off. This can help conserve energy and resource utilization both from an electricity and computing resource or bandwidth utilization perspective.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

What is claimed is:

1. A computer-implemented method, comprising:
   obtaining, by a computing system, from a receiver of a streaming computing device, data comprising Wi-Fi channel state information (CSI), the channel state information comprising Wi-Fi CSI from a receiver associated with a device;
   determining, using a Wi-Fi CSI machine-learned model, a predicted number of viewers located within a predetermined proximity of the receiver;
   transmitting instructions that when executed by a user computing device cause the user computing device to provide for display a prompt for user input responsive to determining the predicted number of viewers;
   obtaining, by the computing system, from the user computing device, data comprising a user-obtained input comprising a number of people in the predetermined proximity of the receiver;
   generating, by the computing system, a training data structure comprising the Wi-Fi CSI, a predicted number of viewers, and the user-obtained input number of viewers;
   updating the Wi-Fi CSI machine-learned model based on the training data structure; and
   predicting, using the updated Wi-Fi CSI machine-learned model, a second number viewers located within the predetermined proximity of the receiver based on second obtained Wi-Fi CSI data.

2. The computer-implemented method of claim 1, further comprising:
   obtaining, by the computing system, from the user computing device second data comprising a user-obtained input comprising a second number of people in the predetermined proximity of the receiver;
   appending the training data structure to include the second Wi-Fi CSI, a second predicted number of viewers, and the second user-obtained number of viewers; and
   updating the Wi-Fi CSI machine-learned model based on the appended training data structure.

3. The computer-implemented method of claim 1, wherein the Wi-Fi CSI machine-learned model determines a baseline Wi-Fi CSI state, and wherein the predicted number of viewers is based at least in part on comparing the baseline Wi-Fi CSI state to the obtained data comprising Wi-Fi CSI.

4. The computer-implemented method of claim 1, comprising:
   transmitting data comprising the predicted second number of viewers located within the predetermined proximity of the receiver to a content selection component;

obtaining, from the content selection component, one or more content items to be provided for display via streaming computing device, the one or more content items selected based at least in part on the predicted second number of viewers; and providing the one or more content items to be provided for display via a user interface of the streaming computing device.

5. The computer-implemented method of claim 4, wherein the one or more content items are selected based at least in part on a household profile.

6. The computer-implemented method of claim 4, wherein the one or more content items are selected based at least in part on a bidding process.

7. The computer-implemented method of claim 1, wherein the user computing device comprises a television meter tablet.

8. The computer-implemented method of claim 1, wherein the predicted second number of viewers is zero viewers, the method comprising:
responsive to determining the predicted second number of viewers is zero viewers, transmitting instructions that when executed by a user computing device cause the user computing device to provide for display a prompt for user input responsive to determining the predicted number of viewers;
determining that a predetermined duration of time has passed without receipt of user input responsive to the displayed prompt; and
automatically adjusting the state of the streaming computing device responsive to determining that the predetermined duration of time has passed without receipt of user input.

9. The computer-implemented method of claim 8, wherein automatically adjusting the state of the streaming computing device comprises altering the state from an active state to an inactive state.

10. The computer-implemented method of claim 9, wherein the inactive state comprises turning the streaming computing device off.

11. The computer-implemented method of claim 1, wherein the streaming computing device comprises at least one of a television or a streaming stick.

12. The computer-implemented method of claim 1, wherein updating the Wi-Fi CSI machine-learned model is further based on automatic content recognition (ACR) data.

13. The computer-implemented method of claim 12, wherein the ACR data comprises at least one of content identification data, viewership measurement data, content tracking data, or content recommendation data.

14. The computer-implemented method of claim 1, wherein the Wi-Fi CSI machine-learned model determines the predicted second number of viewers based at least in part on a rolling window standard deviation.

15. A computing system, comprising:
one or more processors; and
one or more non-transitory computer-readable media storing instructions that are executable to cause the one or more processors to perform operations, the operations comprising:
obtaining, by a computing system, from a receiver of a streaming computing device, data comprising Wi-Fi channel state information (CSI), the channel state information comprising Wi-Fi CSI from a receiver associated with a device;
determining, using a Wi-Fi CSI machine-learned model, a predicted number of viewers located within a predetermined proximity of the receiver;
transmitting instructions that when executed by a user computing device cause the user computing device to provide for display a prompt for user input responsive to determining the predicted number of viewers;
obtaining, by the computing system, from the user computing device, data comprising a user-obtained input comprising a number of people in the predetermined proximity of the receiver;
generating, by the computing system, a training data structure comprising the Wi-Fi CSI, a predicted number of viewers, and the user-obtained input number of viewers;
updating the Wi-Fi CSI machine-learned model based on the training data structure; and
predicting, using the updated Wi-Fi CSI machine-learned model, a second number viewers located within the predetermined proximity of the receiver based on second obtained Wi-Fi CSI data.

16. The computing system of claim 15, the operations comprising:
determining a baseline Wi-Fi CSI dataset for the location within a predetermined distance of the receiver responsive to determining that the streaming computing device is in an inactive state.

17. The computing system of claim 15, wherein the obtained Wi-Fi CSI data comprises raw Wi-Fi CSI data, and wherein the raw Wi-Fi CSI data is processed on-device.

18. The computing system of claim 15, the operations comprising:
transmitting data comprising the predicted second number of viewers located within the predetermined proximity of the receiver to a content selection component;
obtaining, from the content selection component, one or more content items to be provided for display via streaming computing device, the one or more content items selected based at least in part on the predicted second number of viewers; and
providing the one or more content items to be provided for display via a user interface of the streaming computing device.

19. The computing system of claim 15, wherein the viewer is located between a Wi-Fi router device and the streaming computing device.

20. One or more non-transitory computer readable media storing instructions that are executable by one or more processors to perform operations comprising:
obtaining, by a computing system, from a receiver of a streaming computing device, data comprising Wi-Fi channel state information (CSI), the channel state information comprising Wi-Fi CSI from a receiver associated with a device;
determining, using a Wi-Fi CSI machine-learned model, a predicted number of viewers located within a predetermined proximity of the receiver;
transmitting instructions that when executed by a user computing device cause the user computing device to provide for display a prompt for user input responsive to determining the predicted number of viewers;
obtaining, by the computing system, from the user computing device, data comprising a user-obtained input comprising a number of people in the predetermined proximity of the receiver;

generating, by the computing system, a training data structure comprising the Wi-Fi CSI, a predicted number of viewers, and the user-obtained input number of viewers;
updating the Wi-Fi CSI machine-learned model based on the training data structure; and
predicting, using the updated Wi-Fi CSI machine-learned model, a second number viewers located within the predetermined proximity of the receiver based on second obtained Wi-Fi CSI data.

* * * * *